US007847963B2

(12) United States Patent
Sugimoto

(10) Patent No.: US 7,847,963 B2
(45) Date of Patent: Dec. 7, 2010

(54) PRINTING SYSTEM, IMAGE READING APPARATUS AND CONTROLLING METHOD OF THE SYSTEM

(75) Inventor: Hideaki Sugimoto, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1350 days.

(21) Appl. No.: 11/211,761

(22) Filed: Aug. 26, 2005

(65) Prior Publication Data

US 2006/0215210 A1 Sep. 28, 2006

(30) Foreign Application Priority Data

Mar. 28, 2005 (JP) ............................. 2005-091852

(51) Int. Cl.
*G06F 3/12* (2006.01)
(52) U.S. Cl. .................... 358/1.15; 358/1.14; 714/2; 714/5; 714/48
(58) Field of Classification Search ............... 358/1.14, 358/1.15; 399/19; 714/2, 5, 48
See application file for complete search history.

(56) References Cited

U.S. PATENT DOCUMENTS

| | | | | |
|---|---|---|---|---|
| 5,107,339 | A * | 4/1992 | Bertoni et al. ............. 358/296 |
| 6,014,528 | A * | 1/2000 | Natsume et al. ............. 399/19 |
| 6,130,758 | A * | 10/2000 | Funazaki ................... 358/1.15 |
| 6,804,020 | B1 * | 10/2004 | Kuroda ..................... 358/1.15 |
| 7,365,869 | B1 * | 4/2008 | Sumiyama et al. ......... 358/1.14 |
| 2001/0053002 | A1 * | 12/2001 | Kageyama et al. .......... 358/471 |
| 2006/0152759 | A1 * | 7/2006 | Chen et al. ................. 358/1.15 |

FOREIGN PATENT DOCUMENTS

| | | |
|---|---|---|
| JP | A-9-8990 | 1/1997 |
| JP | 2002-084387 | 3/2002 |
| JP | A-2002-196909 | 7/2002 |
| JP | A-2004-130784 | 4/2004 |

OTHER PUBLICATIONS

Original and English-language version of foreign Office Action for Japanese Patent Application No. 2005-091852.
Office Action issued in JP Application No. 2005-091852 on Aug. 10, 2010 (with English translation).

* cited by examiner

*Primary Examiner*—King Y Poon
*Assistant Examiner*—Jamares Washington
(74) *Attorney, Agent, or Firm*—Oliff & Berridge, PLC

(57) ABSTRACT

A printing system in which a print job is generated from original image data which have been read by an image reading apparatus, and the print job is transmitted to a printing apparatus to effect printing, wherein the printing apparatus includes a detecting unit that detects the cancellation of processing of the print job, and a job notifying unit that transmits to the image reading apparatus a job cancellation notification that the print job has been canceled, in correspondence with the detection of the cancellation of processing of the print job, and wherein the image reading apparatus aborts the read processing of the original in correspondence with the reception of the job cancellation notification transmitted from the job notifying unit.

7 Claims, 7 Drawing Sheets

PRINTING SYSTEM, IMAGE READING APPARATUS AND CONTROLLING METHOD OF THE SYSTEM

BACKGROUND OF THE INVENTION

1. Field of the Invention

The present invention relates to a printing system for effecting printing by generating a print job from original image data read by an image reading apparatus and by transmitting the print job to a printing apparatus as well as a method of controlling the same. More particularly, the present invention concerns a printing system which effects a canceling operation on the image reading apparatus side in an interlocked relation to the canceling operation on the printing apparatus side as well as a method of controlling the same.

2. Description of the Related Art

In recent years, a trend toward lower prices is underway in OA (office automation) equipment such as copying machines, combination machines, and the like, and hardware manufacturers who provide these OA equipment to customers are finding it necessary to adopt countermeasures for it.

For this reason, scanner printer systems (printing systems) have been proposed which use a scanner and a printer to realize print processing such as copy processing as they cooperate.

According to such a printing system, there are advantages in that in addition to the fact that print processing such as copy processing can be realized with a simple configuration, it is possible to substantially lower the introduction cost as compared with the introduction of a combination machine or a copying machine.

In this type of printing system, in the case where print processing is carried out through the cooperation between the scanner and the printer, original image data is read from an original by the scanner, its print jobs are sequentially transmitted to the printer, and print processing based on the jobs is executed by the printer. In this case, in a case where the cancellation of jobs by the printer has occurred, it is necessary to correspondingly stop the processing by the scanner as well.

As conventional techniques related to such a technique, one is known in which, as disclosed in Japanese Patent Application Laid-Open No. 2004-130784, a print job on a host terminal can be canceled from the printer side, and the print data subject to cancellation is discarded correspondingly, thereby making it possible to prevent wasteful printing. Also, a technique is known in which, as disclosed in Japanese Patent Application Laid-Open No. 2002-196909, print jobs which have already been sent to the printer from a host terminal can be cancelled in job units by a command from the host terminal, so that jobs can be canceled individually without affecting the other jobs waiting to be printed in the printer.

However, with the conventional techniques including the invention of Japanese Patent Application Laid-Open No. 2004-130784 and the invention of Japanese Patent Application Laid-Open No. 2002-196909 described above, jobs on the host terminal can be canceled from the printer, but jobs in the scanner cannot be cancelled.

In particular, in a printing system configured by the scanner and the printer, the cancellation of the job on the host terminal cannot be applied as it is, in the light of the peculiar characteristic of processing that at the same time as read processing of an original is carried out by the scanner, print processing is carried out by the printer.

Conventionally, in a case where the cancellation of a job has occurred in the printer, such as a shortage in the buffer area of the printer, a print condition parameter error, and a cancellation instruction by the user (the pressing of a cancel button), the printer carries out the processing in which print processing is canceled, print jobs which are sequentially sent from the scanner are deleted, and the print processing is not effected.

However, since the scanner does not recognize that the jobs have been canceled by the printer, the scanner executes continuous scan by an automatic paper feeder and sequentially transmits the print jobs to the printer.

Namely, in the case where the cancellation of jobs has occurred in the printer, there occurs the drawback that since the scanner side, which does not recognize the cancellation, continues to send the print jobs to the printer.

Accordingly, the present invention has been devised in view of the above-described problems to provide a printing system adapted to execute cancel processing of jobs by the interlocking of the image reading apparatus and the printing apparatus as well as a method of controlling the same.

SUMMARY OF THE INVENTION

An aspect of the present invention provides a printing system in which a print job is generated from original image data which have been read by an image reading apparatus, and the print job is transmitted to a printing apparatus to effect printing, wherein: the printing apparatus includes a detecting unit that detects the cancellation of processing of the print job, and a job notifying unit that transmits to the image reading apparatus a job cancellation notification that the print job has been canceled, in correspondence with the detection of the cancellation of processing of the print job, and wherein the image reading apparatus aborts the read processing of the original in correspondence with the reception of the job cancellation notification transmitted from the job notifying unit.

BRIEF DESCRIPTION OF THE DRAWINGS

Embodiments of the present invention will be described in detail based on the following figures, wherein.

DETAILED DESCRIPTION OF THE INVENTION

Hereafter, referring to the accompanying drawings, a detailed description will be given of embodiments of a printing system and a method of controlling the same in accordance with the present invention.

Figure 1:
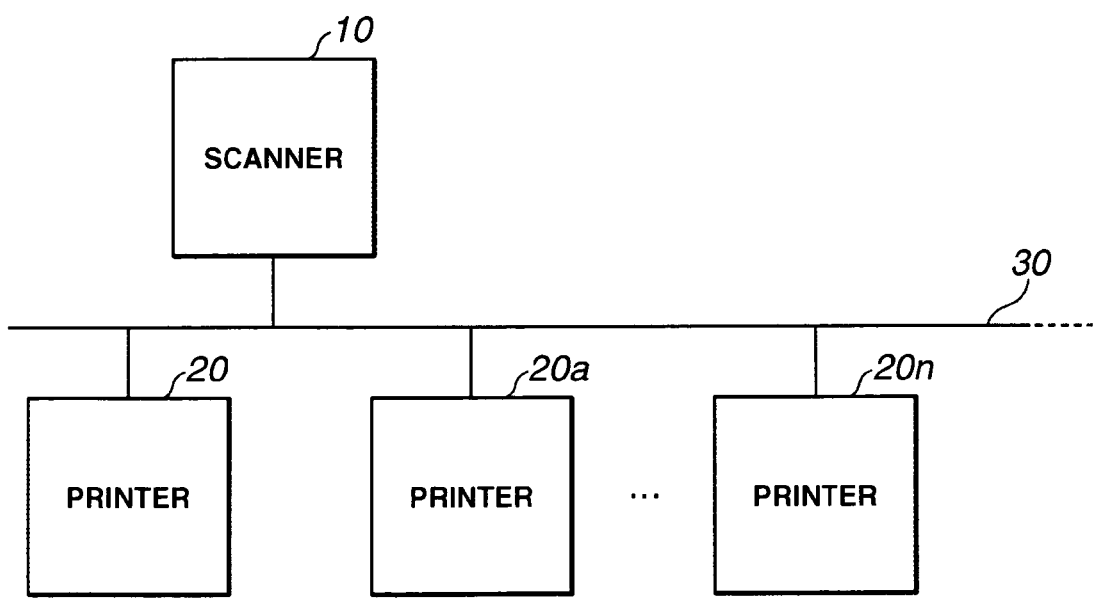
FIG. 1 is a block diagram illustrating an example of the overall configuration of a printing system in accordance with the present invention.

FIG. 1 is a block diagram illustrating an example of the overall configuration of the printing system in accordance with the present invention.

In this printing system, a scanner 10 and a printer 20 as well as a plurality of printers 20a to 20n are connected through a LAN (local area network) 30. It should be noted that although a description will be given herein of a case where the respective apparatuses are connected through the LAN 30, a configuration may be provided such that the apparatuses are connected in a form other than the LAN insofar as the functions of the present invention can be executed. For example, the form of connection between the scanner 10 and the printer 20 may be configured on a one-to-one basis.

The scanner 10 is an image reading apparatus which reads graphics, photographs, characters, or the like from an original placed on or transported onto platen glass in the scan operation, and converts them into digital data. Each time read processing is effected, the original image data which have been read here are sequentially transmitted to the printer 20, and the print processing is executed by the printer 20.

The printer 20 is a printing apparatus for performing print processing on the basis of a print job sent from the scanner 10. The copy function can be realized as the printer 20 in cooperation with the scanner 10 prints out the original image data read by the scanner 10.

In addition, in a case where the cancellation of a print job has occurred due to, for instance, the pressing of a cancel button during the print processing in cooperation with the scanner 10, although details will be described later, the printer 20 transmits a job cancellation notification to the scanner 10. For this reason, since the scanner 10 is also able to recognize the cancellation of the print job which occurred in the printer 20, the scanner 10 and the printer 20 execute the cancel processing in an interlocked relation to each other.

The printers 20a to 20n indicate that a plurality of printers are connected on the LAN 30, and these printers are printing apparatuses having substantially the same functions as those of the printer 20. Further, the printer 20 and the printers 20a to 20n have various characteristics of their own, and include a color compatible printer and a printer capable of printing on large size paper such as A0 and A1. For example, the printing out of the original which has been read by the scanner 10 may be effected by any one of the printers 20a to 20n.

It should be noted that the "cancellation" in the case where the cancellation of the print job has occurred in the printer 20 refers to an internal cancellation factor of the printer 10 such as a shortage in the buffer area of the printer 10 and a print condition parameter error, as well as a cancellation instruction by the user (the pressing of the cancel button), and refers to the cancellation of the print job whose status of execution cannot be continued.

Here, a description will be given of an embodiment of the printing system having a basic configuration as shown in FIG. 1.

Figure 2:
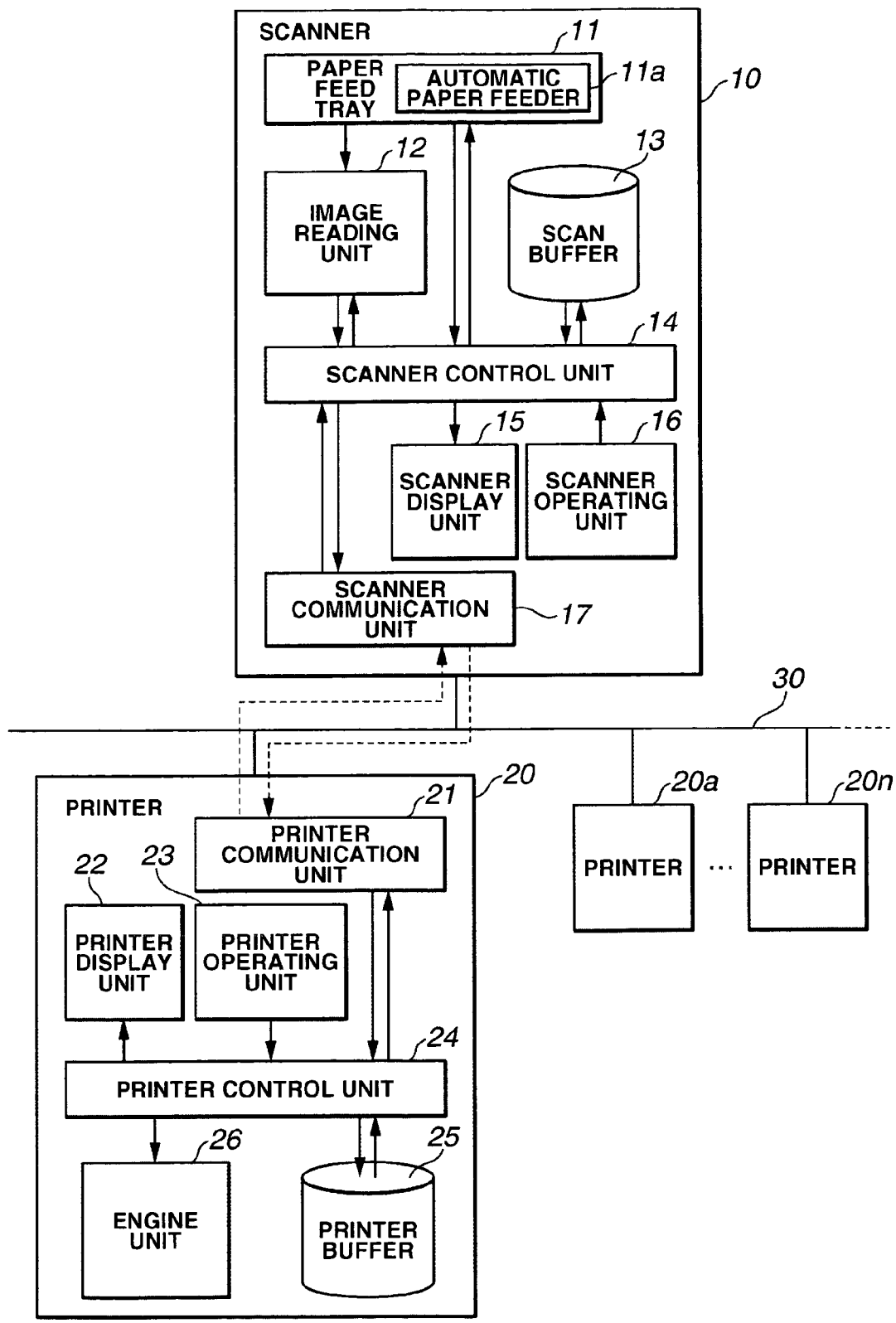
FIG. 2 is a block diagram illustrating the system configuration of a scanner 10 and a printer 20 in accordance with the present invention.

FIG. 2 is a block diagram illustrating the system configuration of the scanner 10 and the printer 20 in accordance with the present invention. It should be noted that a description will be given here by citing only the constituent elements in accordance with the present invention.

The scanner 10 is configured by including a paper feed tray 11 on which an original subject to scanning is set; an image reading unit 12 constituted by an illumination lamp, a lens, a CCD (charge coupled device), and the like, and adapted to read original image data from the original set on the paper feed tray 11; a scan buffer 13 for temporarily caching the original image data which have been read; a scanner control unit 14 for providing supervisory control of the scanner 10; a scanner display unit 15 which is a display device such as a liquid-crystal display; a scanner operating unit 16 which is an input device such as an operating button; and a scanner communication unit 17 which is an interface device for connecting the scanner 10 and the LAN 30.

The paper feed tray 11 is provided with an automatic paper feeder 11a, and even in a case where a plurality of originals are set on the paper feed tray 11, the paper feed tray 11 sequentially sends out the originals one by one to transport them onto an unillustrated paper discharge tray via an unillustrated platen glass.

The image reading unit 12 effects scan processing with respect to the original transported onto the platen glass by the automatic paper feeder 11a to carry out read processing of the original image data. By repeating this operation, the originals set on the paper feed tray 11 can be read continuously.

Meanwhile, the printer 20 is configured by including a printer communication unit 21 which is an interface device for connecting the printer 20 and the LAN 30; a printer display unit 22 which is a display device such as a liquid crystal display; a printer operating unit 23 which is an input device such as an operating button; a printer control unit 24 for providing supervisory control of the printer 20; a printer buffer 25 for temporarily caching the print job which has been received from the scanner 10; and an engine unit 26 which is constituted by a photoconductor drum, a transfer belt, and the like and executes print processing on the basis of the print job received from the scanner 10. Described above is the block diagram illustrating the system configuration of the scanner 10 and the printer 20 in accordance with the present invention.

Figure 3:
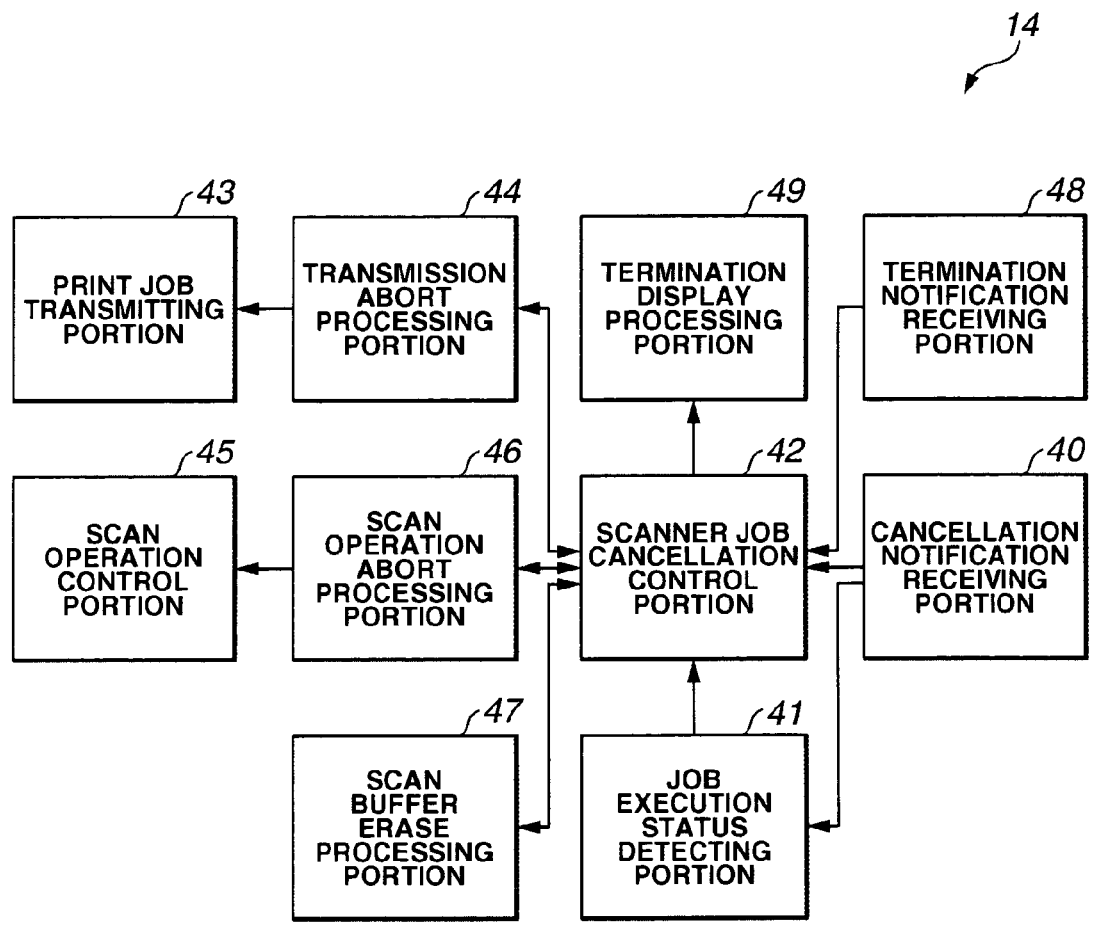
FIG. 3 is a block diagram illustrating a portion of the functional configuration of a scanner control unit 14 shown in FIG. 2.

FIG. 3 is a block diagram illustrating a portion of the functional configuration of the scanner control unit 14 shown in FIG. 2. It should be noted that a description will be given here by citing only the constituent elements in accordance with the present invention.

The scanner control unit 14 is configured by including, as various processing function portions, a cancellation notification receiving portion 40, a job execution status detecting portion 41, a scanner job cancellation control portion 42, a print job transmitting portion 43; a transmission abort processing portion 44; a scan operation control portion 45, a scan operation abort processing portion 46, a scan buffer erase processing portion 47, a termination notification receiving portion 48, and a termination display processing portion 49.

The cancellation notification receiving portion 40 is a processing portion for receiving a job cancellation notification from the printer 20 through the scanner communication unit 17. Further, the cancellation notification receiving portion 40 transfers the received job cancellation notification to the job execution status detecting portion 41 and the scanner job cancellation control portion 42.

The job execution status detecting portion 41 is a processing portion which, upon receiving the job cancellation notification from the cancellation notification receiving portion 40, detects the status of execution of the job being carried out by the scanner 10 at that point of time, and outputs the result of detection to the scanner job cancellation control portion 42. The status of execution of the job being carried out by the scanner 10 includes the reading of the original being executed, a print job being transmitted, standby, and the like, and is information of a level which makes it possible to recognize which operation of the scanner 10 is to be aborted at the time of cancellation of the job which is executed by the scanner.

The scanner job cancellation control portion 42 is a processing portion which controls the cancel processing of the job on the basis of the result of detection from the job execution status detecting portion 41. Namely, the job cancellation processing corresponding to the status of operation of the scanner 10 is executed under control by the scanner job cancellation control portion 42.

For example, in the case where the original read processing is being executed, the aborting of scan operation, the aborting of transmission of the print job, and the deletion of cache data are carried out. However, in the case where the original read processing and the print job transmission processing have already been finished, cancel processing is not carried out in particular. The job cancellation processing corresponding to the status of operation of the scanner 10 is thus executed under control by the scanner job cancellation control portion 42.

The print job transmitting portion 43 is a processing portion which generates a print job based on the original image data read by the image reading unit 12 and transmits it to the printer 20. The transmission abort processing portion 44 is a processing portion which instructs the aborting of transmission to the print job transmitting portion 43. The print job transmitting portion 43, upon receiving the transmission abort instruction from the transmission abort processing portion 44, aborts the processing of transmission of the print job to the printer 20.

The scan operation control portion 45 is a processing portion which controls the operation of the automatic paper feeder 11*a* and the image reading unit 12 and controls the scan processing of the original. The scan operation abort processing portion 46 is a processing portion which instructs the aborting of the scan operation to the scan operation control portion 45. The scan operation control portion 45, upon receiving the scan operation abort instruction from the scan operation abort processing portion 46, aborts the scan processing by the automatic paper feeder 11*a* and the image reading unit 12.

The scan buffer erase processing portion 47 is a processing portion which deletes the original image data temporarily cached in the scan buffer 13. The aforementioned scanner job cancellation control portion 42 executes the job cancel processing in the scanner 10 by controlling the transmission abort processing portion 44, the scan operation abort processing portion 46, and the scan buffer erase processing portion 47 on the basis of result of detection from the job execution status detecting portion 41.

The termination notification receiving portion 48 is a processing portion which receives a job termination notification from the printer 20 through the scanner communication unit 17. The job termination notification is a notification to the effect that the cancel processing of the print job has been terminated in the printer 20. The termination notification receiving portion 48, upon receiving the job termination notification, transmits to the scanner job cancellation control portion 42 the notification that the job has terminated.

The termination display processing portion 49 is a processing portion which notifies the user that the job cancel processing has been terminated. Specifically, upon receiving a request for termination display from the scanner job cancellation control portion 42, the termination display processing portion 49 displays on the scanner display unit 15 that the job cancel processing has been terminated in both the scanner 10 and the printer 20. Described above are the respective functional blocks illustrating a portion of the functional configuration of the scanner control unit 14.

Figure 4:
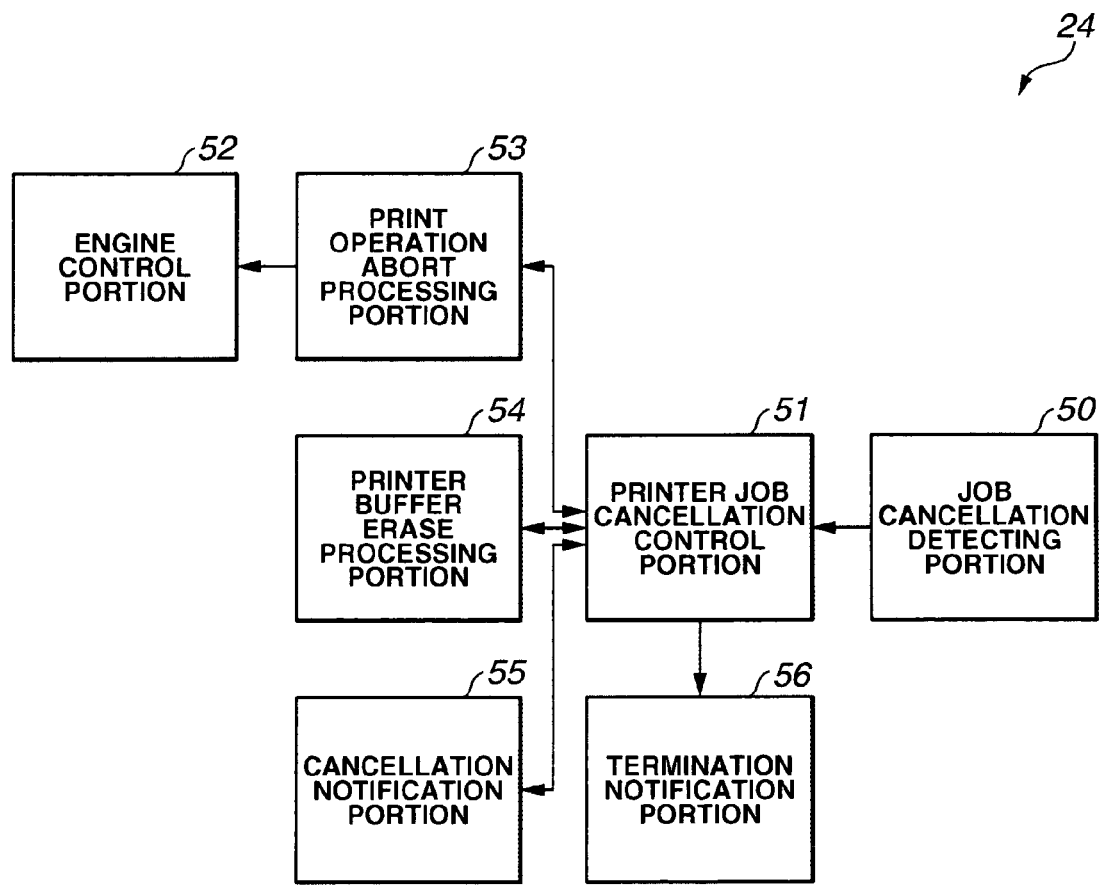
FIG. 4 is a block diagram illustrating a portion of the functional configuration of a printer control unit 24 shown in FIG. 2.

FIG. 4 is a block diagram illustrating a portion of the functional configuration of the printer control unit 24 shown in FIG. 2. It should be noted that a description will be given here by citing only the constituent elements in accordance with the present invention.

The printer control unit 24 is configured by including, as various processing function portions, a job cancellation detecting portion 50, a printer job cancellation control portion 51, an engine control portion 52, a print operation abort processing portion 53, a printer buffer erase processing portion 54, a cancellation notification portion 55, and a termination notification portion 56.

The job cancellation detecting portion 50 is a processing portion which detects that a print job being executed by the printer 20 has been canceled. Factors for cancellation of a print job being executed by the printer 20 include a shortage in the buffer area of the printer buffer 25, a print condition parameter error, and a cancellation instruction by the user (the pressing of the cancel button), and the like. The job cancellation detecting portion 50, upon detecting that the print job has been canceled owing to such a cancellation factor, notifies the printer job cancellation control portion 51 to that effect.

The printer job cancellation control portion 51 is a processing portion which, upon receiving from the job cancellation detecting portion 50 the notification that the cancellation of the print job has been detected, carries out the cancel processing of the print job being executed by the printer 20, and indirectly controls the cancellation of the job being executed by the scanner 10.

The engine control portion 52 is a processing portion which executes print processing by controlling the engine unit 26. The print operation abort processing portion 53 is a processing portion which instructs the aborting of printing to the engine control portion 52. The engine control portion 52, upon receiving the printing abort instruction from the print operation abort processing portion 53, aborts print processing by the engine unit 26.

The printer buffer erase processing portion 54 is a processing portion which deletes the print job cached in the printer buffer 25.

The cancellation notification portion 55 is a processing portion which transmits to the scanner 10 a job cancellation notification indicating that the cancellation of the print job has occurred in the printer 20. Namely, as the cancellation notification portion 55 notifies the scanner 10 that the cancellation of the print job has occurred in the printer 20, the scanner 10 and the printer 20 are able to execute the cancel processing of the job by being interlocked with each other. The aforementioned printer job cancellation control portion 51 carries out the cancel processing of the print job being executed by the printer 20 by controlling the print operation abort processing portion 53, the printer buffer erase processing portion 54, and the cancellation notification portion 55, and indirectly controls the cancellation of the job being executed by the scanner 10.

The termination notification portion 56 is a processing portion which transmits to the scanner 10 a job termination notification indicating that the job cancel processing has terminated in the printer 20. Described above are the respective functional blocks illustrating a portion of the functional configuration of the printer control unit 24.

Figure 5:
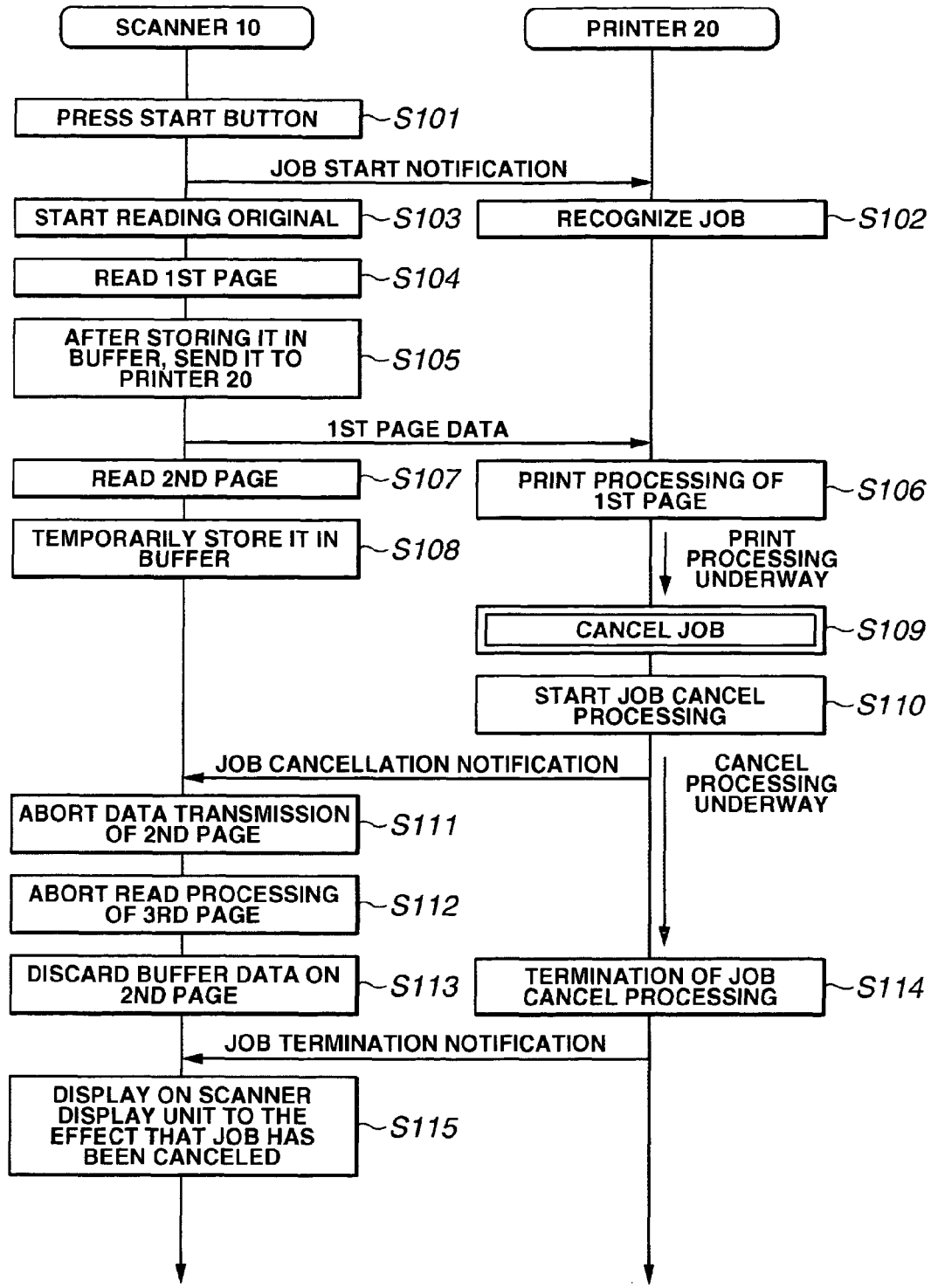
FIG. 5 is a sequence chart (pattern 1) illustrating the flow of processing in the printing system in accordance with the present invention.
Figure 6:
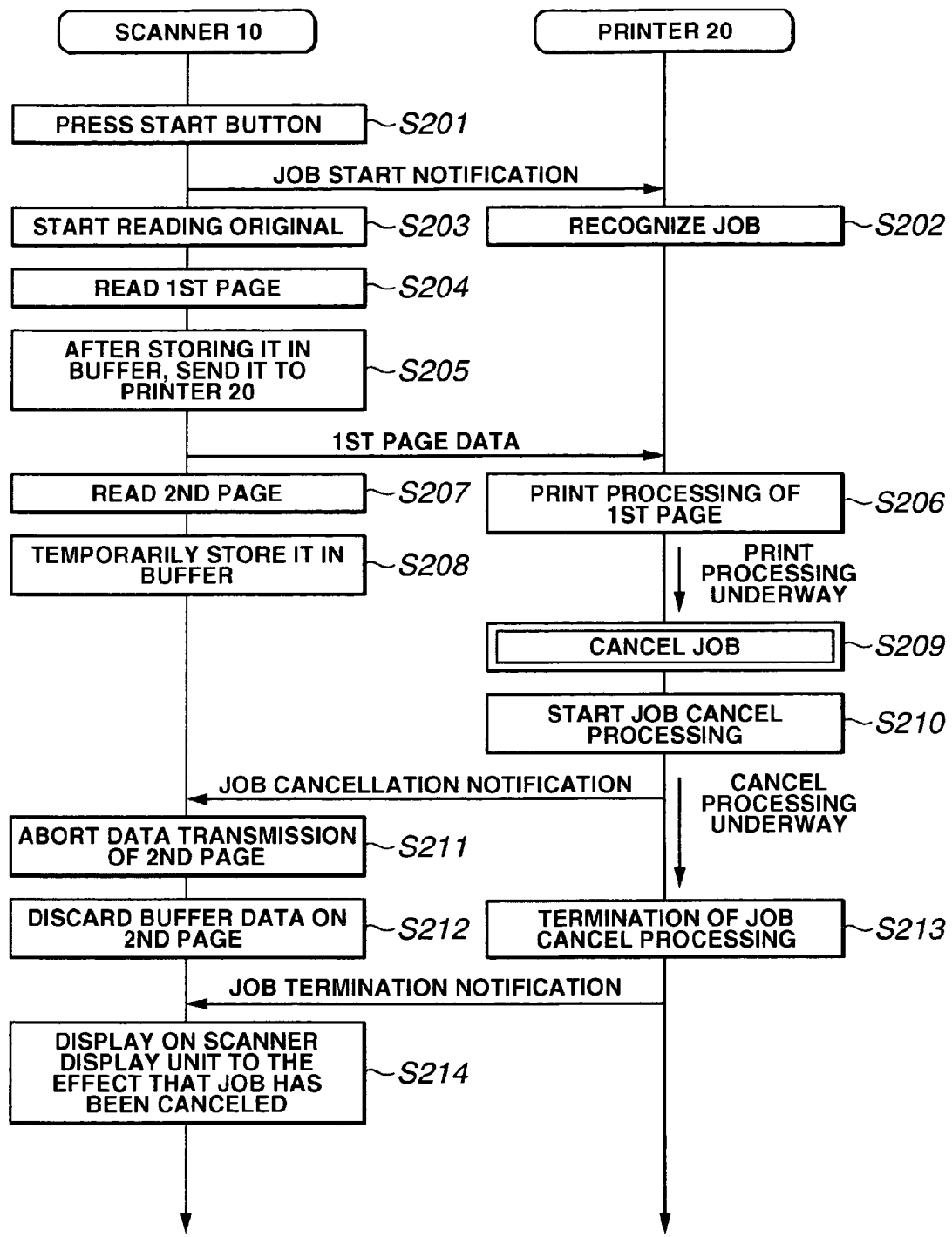
FIG. 6 is a sequence chart (pattern 2) illustrating the flow of processing in the printing system in accordance with the present invention.
Figure 7:
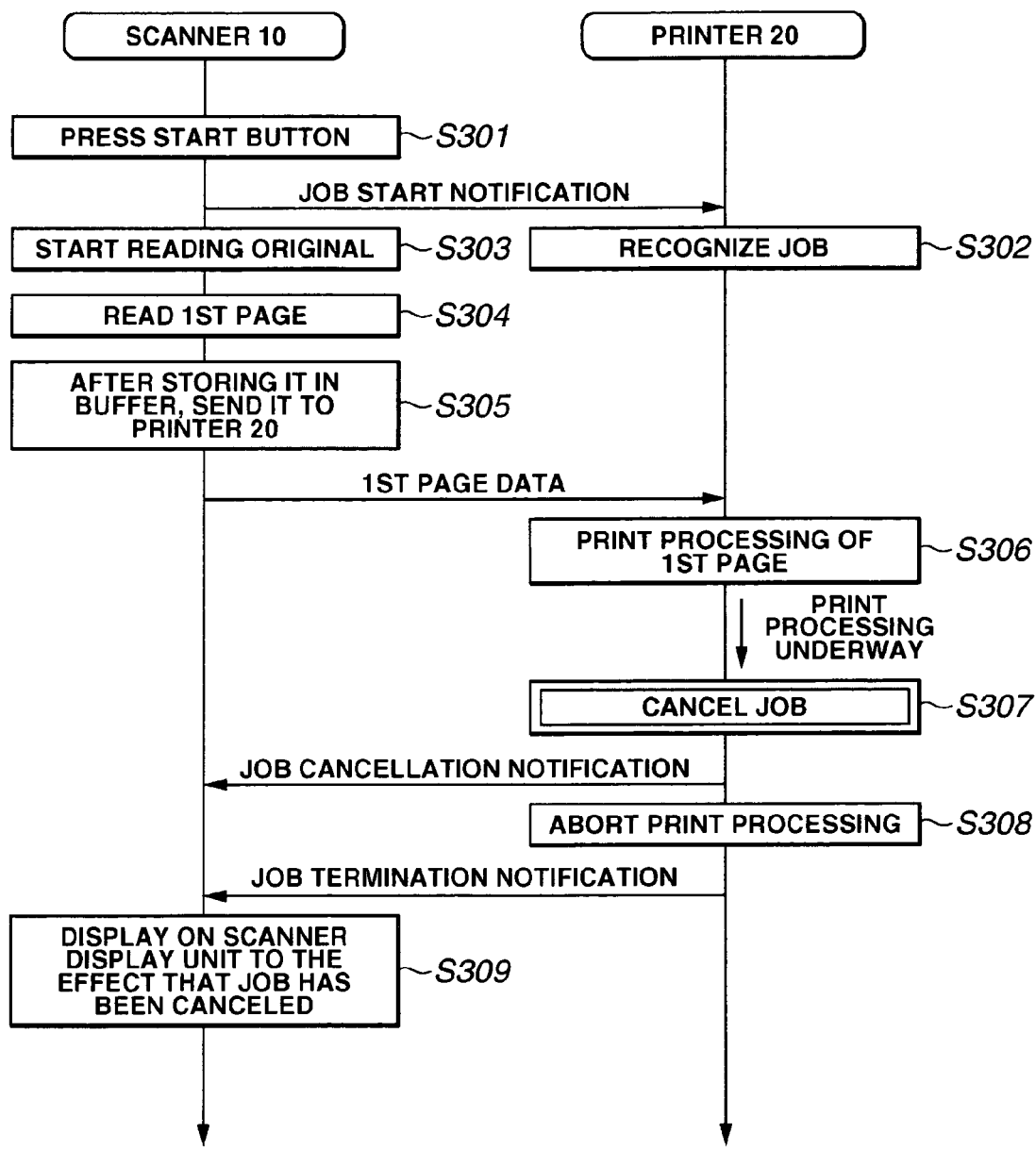
FIG. 7 is a sequence chart (pattern 3) illustrating the flow of processing in the printing system in accordance with the present invention.

FIGS. 5 to 7 are sequence charts illustrating the flow of processing in the printing system in accordance with the present invention. It should be noted that illustration is given here of the operation in a case where a print job has been canceled in the printer 20 while the scanner 10 and the printer 20 are executing print (copy) processing in cooperation with each other. As an example of the flow of this processing, a description will be given of three patterns of operation.

First, referring to FIG. 5, a description will be given of the operation in a case where a plurality of (three or more) originals have been set in advance on the paper feed tray 11 of the scanner 10, and the cancellation of the print job has occurred in the printer 20 when the read processing of the second original has been effected.

First, when the start button disposed on the scanner operating unit 16 is pressed by the user, a job start notification is generated by the scanner control unit 14, and this notification is sent to the printer 20 through the scanner communication unit 17 (Step S101). Meanwhile, the printer 20 which received the job start notification recognizes that the job has been started by the printer control unit 24 in the scanner 10 (Step S102).

On pressing of the start button, the image reading unit 12 and the automatic paper feeder 11a operate to start the read processing of the original under control by the scan operation control portion 45 (Step S103). In this read processing, the first page original of the plurality of originals set on the paper feed tray 11 is transported onto the platen glass by the automatic paper feeder 11a, and the original image data of the first page are read by the image reading unit 12 (Step S104). The original image data which have been read are temporarily cashed in the scan buffer 13.

After a print job based on the original image data of the first page has been generated, the cached original image data are transmitted to the printer 20 through the scanner communication unit 17 by the print job transmitting portion 43 (Step S105).

The printer 20, upon receiving the print job from the scanner 10, stores the job in the printer buffer 25 by means of the printer control unit 24, and executes print processing by the engine unit 26 under control by the engine control portion 52 (Step S106).

Meanwhile, at the same time as the print processing of the first page is carried out in the printer 20, the scanner 10 starts the read processing of the second page original (Step S107), and temporarily caches in the scan buffer 13 the original image data which have been read (Step S108). At the same time as the print processing of the original image data which have been read by the scanner 10 is thus executed by the printer 20, the scanner 10 carries out the read processing of the original image data of the next page.

Here, in a case where the cancellation of the print job has occurred in the printer 20 (Step S109), the cancellation of the print job is detected by the job cancellation detecting portion 50 of the printer 20, and the printer job cancellation control portion 51 is notified to that effect.

The printer job cancellation control portion 51, upon receiving this notification, starts the cancel processing of the print job being executed by the printer 20 by controlling the print operation abort processing portion 53 and the printer buffer erase processing portion 54, and instructs the cancellation notification portion 55 to transmit a job cancellation notification to the scanner 10. Upon the instruction, the cancellation notification portion 55 transmits the job cancellation notification to the scanner 10 (Step S110).

The scanner 10 which received the job cancellation notification recognizes that the cancellation of the print job has occurred in the printer 20. The scan operation abort processing portion 46, upon thus recognizing the cancellation of the job, starts the cancel processing of the job being executed by the scanner 10 by controlling the transmission abort processing portion 44, the scan operation abort processing portion 46, and the scan buffer erase processing portion 47 on the basis of the result of detection from the job execution status detecting portion 41.

In the job cancel processing, the transmission of the original image data of the second page to the printer 20 is aborted by the transmission abort processing portion 44 (Step S111), and the read processing of the third page original by the automatic paper feeder 11a and the image reading unit 12 is aborted by the scan operation abort processing portion 46 (Step S112). Further, the original image data of the second page temporarily cached in the scan buffer 13 are deleted by the scan buffer erase processing portion 47 (Step S113).

In addition, when the cancel processing of the print job is terminated in the printer 20, a job termination notification is sent from the termination notification portion 56 to the scanner 10 (Step S114).

In the scanner 10, upon receiving the job termination notification, when the job cancel processing in the scanner 10 is finished, a request of displaying the termination is made from the scanner job cancellation control portion 42 to the termination display processing portion 49. The termination display processing portion 49, upon receiving this request, displays on the scanner display unit 15 that the cancel processing of the job has been terminated in both the scanner 10 and the printer 20 (Step S115). Then, this processing ends.

Next, referring to FIG. 6, a description will be given of the operation in a case where a plurality of (two) originals have been set in advance on the paper feed tray 11 of the scanner 10, and the cancellation of the print job has occurred in the printer 20 when the read processing of the final original (second page) has been effected.

First, when the start button disposed on the scanner operating unit 16 is pressed by the user, a job start notification is generated by the scanner control unit 14, and this notification is sent to the printer 20 through the scanner communication unit 17 (Step S201). Meanwhile, the printer 20 which received the job start notification recognizes that the job has been started by the printer control unit 24 in the scanner 10 (Step S202).

On pressing of the start button, the image reading unit 12 and the automatic paper feeder 11a operate to start the read processing of the original under control by the scan operation control portion 45 (Step S203). In this read processing, the first page original of the plurality of originals set on the paper feed tray 11 is transported onto the platen glass by the automatic paper feeder 11a, and the original image data of the first page are read by the image reading unit 12 (Step S204). The original image data which have been read are temporarily cashed in the scan buffer 13.

After a print job based on the original image data of the first page has been generated, the cached original image data are transmitted to the printer 20 through the scanner communication unit 17 by the print job transmitting portion 43 (Step S205).

The printer 20, upon receiving the print job from the scanner 10, stores the job in the printer buffer 25 by means of the printer control unit 24, and executes print processing by the engine unit 26 under control by the engine control portion 52 (Step S206).

Meanwhile, at the same time as the print processing of the first page is carried out in the printer 20, the scanner 10 starts the read processing of the second page original (Step S207), and temporarily caches in the scan buffer 13 the original image data which have been read (Step S208). At the same time as the print processing of the original image data which have been read by the scanner 10 is thus executed by the printer 20, the scanner 10 carries out the read processing of the original image data of the next page.

Here, in a case where the cancellation of the print job has occurred in the printer 20 (Step S209), the cancellation of the print job is detected by the job cancellation detecting portion 50 of the printer 20, and the printer job cancellation control portion 51 is notified to that effect.

The printer job cancellation control portion 51, upon receiving this notification, starts the cancel processing of the print job being executed by the printer 20 by controlling the print operation abort processing portion 53 and the printer buffer erase processing portion 54, and instructs the cancellation notification portion 55 to transmit a job cancellation notification to the scanner 10. Upon the instruction, the cancellation notification portion 55 transmits the job cancellation notification to the scanner 10 (Step S210).

The scanner 10 which received the job cancellation notification recognizes that the cancellation of the print job has occurred in the printer 20. The scan operation abort processing portion 46, upon thus recognizing the cancellation of the job, starts the cancel processing of the job being executed by the scanner 10 by controlling the transmission abort processing portion 44, the scan operation abort processing portion 46, and the scan buffer erase processing portion 47 on the basis of the result of detection from the job execution status detecting portion 41.

In the job cancel processing, the transmission of the original image data of the second page to the printer 20 is aborted by the transmission abort processing portion 44 (Step S211), and the original image data of the second page temporarily cached in the scan buffer 13 are deleted by the scan buffer erase processing portion 47 (Step S212). In this case, since the number of originals set in advance on the paper feed tray 11 is two (the second page has already been read), and the third page original to be read does not exist, the read processing of the original by the automatic paper feeder 11a and the image reading unit 12 is not carried out, so that there is no job cancel processing by the scan operation abort processing portion 46.

Then, when the cancel processing of the print job is terminated in the printer 20, a job termination notification is sent from the termination notification portion 56 to the scanner 10 (Step S213).

In the scanner 10, upon receiving the job termination notification, when the job cancel processing in the scanner 10 is finished, a request of displaying the termination is made from the scanner job cancellation control portion 42 to the termination display processing portion 49. The termination display processing portion 49, upon receiving this request, displays on the scanner display unit 15 that the cancel processing of the job has been terminated in both the scanner 10 and the printer 20 (Step S214). Then, this processing ends.

Next, referring to FIG. 7, a description will be given of the operation in a case where one original has been set in advance on the paper feed tray 11 of the scanner 10, and the cancellation of the print job has occurred in the printer 20 when the processing of that original has been finished (the processing by the scanner 10 has been finished).

First, when the start button disposed on the scanner operating unit 16 is pressed by the user, a job start notification is generated by the scanner control unit 14, and this notification is sent to the printer 20 through the scanner communication unit 17 (Step S301). Meanwhile, the printer 20 which received the job start notification recognizes that the job has been started by the printer control unit 24 in the scanner 10 (Step S302).

On pressing of the start button, the image reading unit 12 and the automatic paper feeder 11a operate to start the read processing of the original under control by the scan operation control portion 45 (Step S303). In this read processing, the first page original of the plurality of originals set on the paper feed tray 11 is transported onto the platen glass by the automatic paper feeder 11a, and the original image data of the first page are read by the image reading unit 12 (Step S304). The original image data which have been read are temporarily cashed in the scan buffer 13.

After a print job based on the original image data of the first page has been generated, the cached original image data are transmitted to the printer 20 through the scanner communication unit 17 by the print job transmitting portion 43 (Step S305).

The printer 20, upon receiving the print job from the scanner 10, stores the job in the printer buffer 25 by means of the printer control unit 24, and executes print processing by the engine unit 26 under control by the engine control portion 52 (Step S306). Meanwhile, the scanner 10 is set on standby since the read processing of the original set on the paper feed tray 11 has been finished.

Here, in a case where the cancellation of the print job has occurred in the printer 20 (Step S307), the cancellation of the print job is detected by the job cancellation detecting portion 50 of the printer 20, and the printer job cancellation control portion 51 is notified to that effect.

The printer job cancellation control portion 51, upon receiving this notification, starts the cancel processing of the print job being executed by the printer 20 by controlling the print operation abort processing portion 53 and the printer buffer erase processing portion 54, and instructs the cancellation notification portion 55 to transmit a job cancellation notification to the scanner 10. Upon the instruction, the cancellation notification portion 55 transmits the job cancellation notification to the scanner 10 (Step S308).

The scanner 10 which received the job cancellation notification recognizes that the cancellation of the print job has occurred in the printer 20. The scan operation abort processing portion 46, upon thus recognizing the cancellation of the job, starts the cancel processing of the job being executed by the scanner 10 by controlling the transmission abort processing portion 44, the scan operation abort processing portion 46, and the scan buffer erase processing portion 47 on the basis of the result of detection from the job execution status detecting portion 41. In this case, since the job in the scanner 10 has been finished, the scan operation abort processing portion 46 effects no particular processing.

Then, when the cancel processing of the print job is terminated in the printer 20, a job termination notification is sent from the termination notification portion 56 to the scanner 10 (Step S308).

In the scanner 10, upon receiving the job termination notification, a request of displaying the termination is made from the scanner job cancellation control portion 42 to the termination display processing portion 49. The termination display processing portion 49, upon receiving this request, displays on the scanner display unit 15 that the cancel processing of the job has been terminated in both the scanner 10 and the printer 20 (Step S309). Then, this processing ends.

As described above, in the present invention, the arrangement provided is such that in the case where a print job has been canceled in the printer 20 while the scanner 10 and the printer 20 are executing print (copy) processing in cooperation with each other, the cancel processing of the print job being executed by the printer 20 is carried out, and the job is canceled also on the scanner 10 side by transmitting a job cancellation notification to the scanner 10. Therefore, since the scanner 10 side is able to recognize the cancellation of the print job which occurred in the printer 20, the scanner 10 and the printer 20 are able to execute the cancel processing in an interlocked relation to each other.

For this reason, it is possible to eliminate the wasteful operation in which the read processing of the original (image reading operation, job transmit processing, etc.) is continued on the scanner 10 side despite the fact that the print job has been canceled on the printer 20 side.

In addition, since the scanner 10 detects the status of job execution of its own at the point of time of reception of the job cancellation notification from the printer 20, and executes the cancel processing of the job of its own on the basis of such a result of detection, the scanner 10 is able to accurately execute the cancel processing of the job.

As described above, a first aspect of the present invention provides a printing system in which a print job is generated from original image data which have been read by an image reading apparatus, and the print job is transmitted to a printing apparatus to effect printing, wherein the printing apparatus includes a detecting unit that detects the cancellation of processing of the print job, and a job notifying unit that transmits to the image reading apparatus a job cancellation notification that the print job has been canceled, in correspondence with the detection of the cancellation of processing of the print job, and wherein the image reading apparatus aborts the read processing of the original in correspondence with the reception of the job cancellation notification transmitted from the job notifying unit.

A second aspect of the present invention provides the printing system according to the first aspect of the invention, wherein the image reading apparatus includes a receiving unit that receives the job cancellation notification transmitted from the job notifying unit; an execution status detecting unit that detects a state of execution of the read processing of the original at a point of time when the job cancellation notification was received by the receiving unit; and an abort controlling unit that aborts the read processing of the original on the basis of a result of detection by the execution status detecting unit.

A third aspect of the present invention provides the printing system according to the second aspect of the invention claim 2, wherein the image reading apparatus includes an image reading unit that reads the original image data from the original; a buffer unit that temporarily caches the original image data which have been read by the image reading unit; and a print job transmitting unit that transmits to the printing apparatus the print job generated on the basis of the original image data temporarily cached in the buffer unit, wherein the abort controlling unit selectively executes one of the aborting of the reading of the original image data by the image reading unit, the deletion of the original image data temporarily cached in the buffer unit, and the aborting of transmission of the print job by the print job transmitting unit.

A fourth aspect of the present invention provides the printing system according to the second aspect of the invention, wherein the image reading apparatus includes an image reading unit that reads the original image data from the original; a buffer unit that temporarily caches the original image data which have been read by the image reading unit; and a print job transmitting unit that transmits to the printing apparatus the print job generated on the basis of the original image data temporarily cached in the buffer unit, wherein the abort controlling unit executes the aborting of the reading of the original image data by the image reading unit, the deletion of the original image data temporarily cached in the buffer unit, and the aborting of transmission of the print job by the print job transmitting unit.

A fifth aspect of the present invention provides the printing system according to any one of the first to fourth aspects of the invention, wherein the detecting unit detects the cancellation of the print job on the basis of an instruction on cancellation of the print job by a user's operation in the printing apparatus, or the occurrence of an internal cancellation factor of the print job in the printing apparatus.

A sixth aspect of the present invention provides a method of controlling a printing system in which a print job is generated from original image data which have been read by an image reading apparatus, and the print job is transmitted to a printing apparatus to effect printing, the method including detecting by a detecting unit of the printing apparatus the cancellation of processing of the print job; and transmitting by a job notifying unit of the printing apparatus to the image reading apparatus a job cancellation notification that the print job has been canceled, in correspondence with the detection of the cancellation of processing of the print job by the detecting unit, and aborting by the image reading apparatus the read processing of the original in correspondence with the reception of the job cancellation notification transmitted from the job notifying unit.

According to the above-mentioned aspects of the present invention, the arrangement provided is such that when the printing apparatus detects the cancellation of execution of the print job, in correspondence with the detection the printing apparatus transmits to the image reading apparatus the job cancellation notification that the print job has been canceled, and the image reading apparatus side aborts the read processing of the original in response to the reception of the job cancellation notification. Therefore, since the image reading apparatus is able to recognize the cancellation of the print job in the printing apparatus, the image reading apparatus and the printing apparatus are able to execute the cancel processing in an interlocked relation to each other.

For this reason, it is possible to eliminate the wasteful operation in which the read processing of the original (image reading operation, job transmit processing, etc.) is continued on the image reading apparatus side despite the fact that the print job has been canceled on the printing apparatus side.

In addition, since the image reading apparatus detects the status of execution of the read processing of the original at the point of time of reception of the job cancellation notification from the printing apparatus, and aborts the read processing of the original on the basis of such a result of detection, the image reading apparatus is able to accurately execute the cancel processing.

The printing system and the method of controlling the same in accordance with the present invention are applicable to printing systems in general, and can be effectively utilized in the case of eliminating the wasteful operation of the image reading apparatus in which the scan operation is continued without being able to ascertain the cancellation of the job, since the image reading apparatus and the printing apparatus execute the cancel processing of the job in an interlocked relation to each other.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-91852 filed on Mar. 28, 2005 including specification, claims, drawings and abstract is incorporated herein by reference in its entirety.

What is claimed is:

1. A printing system
   a printing apparatus; and
   an image reading apparatus that is connected to the printing apparatus through communication lines, reads original image data from an original image to generate a print job from the read original image data and transmits the print job to the printing apparatus through the communication lines to request printing,
   the printing apparatus comprising:
      a detecting unit that detects cancellation of the processing of the print job; and
      a job notifying unit that transmits to the image reading apparatus a job cancellation notification notifying that the print job has been canceled, in correspondence with the detection of the cancellation of the processing of the print job by the detecting unit, and
   the image reading apparatus comprising:
      an image reading unit that reads original image data from the original image;
      a buffer unit that temporarily caches only single page increments of the original image data read by the image reading unit;
      a print job generating unit that generates the print job on the basis of the original image data temporarily cached in the buffer unit;
      a print job transmitting unit that transmits to the printing apparatus the print job generated by the print job generating unit;
      a receiving unit that receives the job cancellation notification transmitted from the job notifying unit;
      an execution status detecting unit that detects an execution state of reading processing of the original image at the time of receiving the job cancellation notification by the receiving unit; and
   an abort controlling unit that, when it is found as a result of detection by the execution status detecting unit that there are original images which have not been fully read by the image reading unit and original image data which has not been fully transmitted to the printing apparatus in the buffer unit, aborts the reading of the original images which have not been fully read and deletes the original image data which have not been fully transmitted to the printing apparatus from the buffer unit and deletes the contents of the buffer.

2. An image reading apparatus that is connected to a printing apparatus through communication lines, reads original image data from an original image to generate a print job from the read original image data and transmits the print job to the printing apparatus through the communication lines to request printing, comprising:
   an image reading unit that reads original image data from the original image;
   a buffer unit that temporarily caches only single page increments of the original image data read by the image reading unit;
   a print job generating unit that generates the print job on the basis of the original image data temporarily cached in the buffer unit;
   a print job transmitting unit that transmits to the printing apparatus the print job generated by the print job generating unit;
   a receiving unit that receives job cancellation notification transmitted from the printing apparatus;
   an execution status detecting unit that detects an execution state of read processing of the original image at the time of receiving the job cancellation notification by the receiving unit; and
   an abort controlling unit that, when it is found as a result of detection by the execution status detecting unit that there are original images which have not been fully read by the image reading unit and original image data which have not been fully transmitted to the printing apparatus in the buffer unit, aborts the reading of the original images which have not been fully read and deletes the original image data which have not been fully transmitted to the printing apparatus from the buffer unit and deletes the contents of the buffer.

3. A method of controlling a printing system comprising a printing apparatus and an image reading apparatus that is connected to the printing apparatus through communication lines, reads original image data from an original image to generate a print job from the read original image data and transmits the print job to the printing apparatus through the communication lines to request printing, the method comprising:
   transmitting from the printing apparatus to the image reading apparatus a job cancellation notification, notifying that the print job has been canceled when the printing apparatus detects the cancellation of processing the print job;
   reading by the image reading apparatus original image data from the original image;
   temporarily caching only single page increments of the original image data read by the image reading apparatus;
   generating by the image reading apparatus the print job on the basis of the temporarily cached original image data;
   transmitting by the image reading apparatus the generated print job to the printing apparatus;
   detecting by the image reading apparatus an execution state of read processing of the original image at the time of receiving the job cancellation notification when the image reading apparatus receives the job cancellation notification; and
   when it is found as a result of detection by the image reading apparatus that there are original images which have not been fully read and original image data which has not been fully transmitted to the printing apparatus, aborting reading of the original images which have not been fully read and deleting the original image data which has not been fully transmitted to the printing apparatus and the temporarily cached data.

4. The printing system according to claim 1, wherein the detecting unit detects the cancellation of the print job on the basis of a print job cancellation instruction by a user's operation in the printing apparatus.

5. The printing system according to claim 1, wherein the detecting unit detects the cancellation of the print job on the basis of occurrence of an internal cancellation factor in the printing apparatus.

6. The method of controlling a printing system according to claim 3, wherein the detection of the cancellation of the print job is performed on the basis of an instruction on cancellation of the print job by the user's operation in the printing apparatus.

7. The method of controlling a printing system according to claim 3, wherein the detection of the cancellation of the print job is performed on the basis of occurrence of an internal cancellation factor of the print job in the printing apparatus.

* * * * *